June 3, 1969 — W. O. MILLER ETAL — 3,447,495
APPARATUS FOR INJECTION OF SOIL CHEMICALS
Filed June 1, 1967
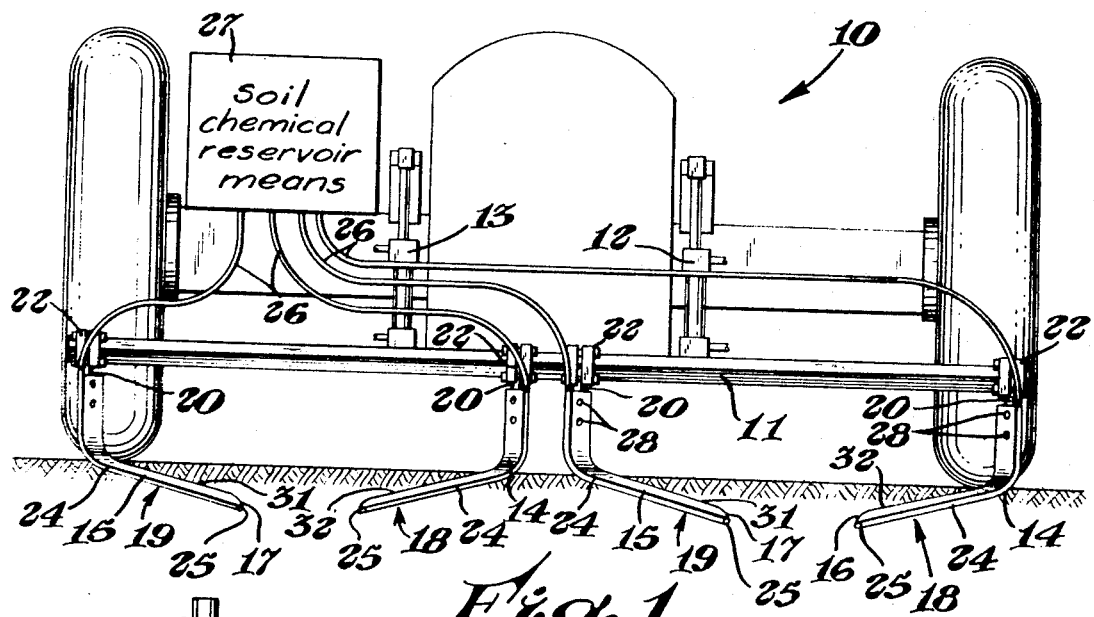
Fig. 1
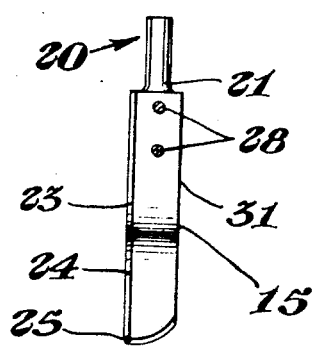
Fig. 2
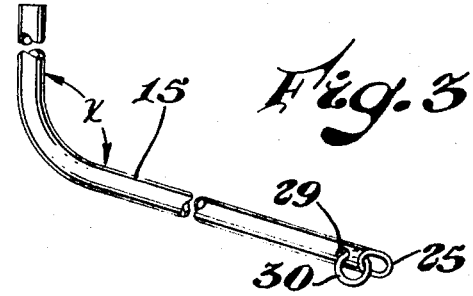
Fig. 3
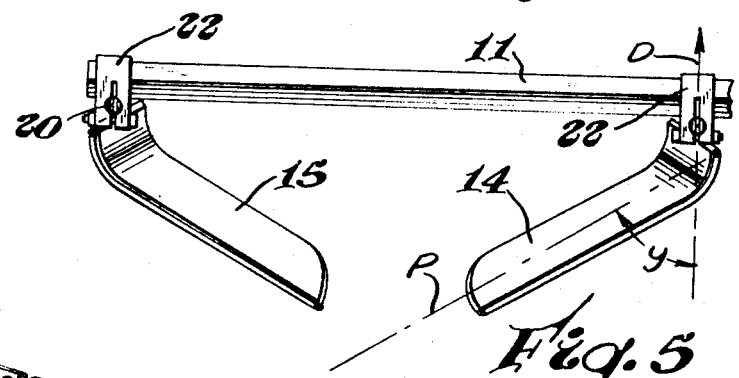
Fig. 4
Fig. 5
INVENTORS.
Walter O. Miller
BY John W. Weseloh, Jr
Edward E. Schilling
ATTORNEY

United States Patent Office 3,447,495
Patented June 3, 1969

3,447,495
APPARATUS FOR INJECTION OF SOIL CHEMICALS
Walter O. Miller, Leland, Miss., and John W. Weseloh, Jr., Richardson, Tex., assignors to The Dow Chemical Company, Midland, Mich., a corporation of Delaware
Filed June 1, 1967, Ser. No. 642,913
Int. Cl. A01c 23/02; A01b 49/00, 39/18
U.S. Cl. 111—7                                    7 Claims

ABSTRACT OF THE DISCLOSURE

Apparatus for the injection of a soil chemical into tillable soil in which a generally L-shaped blade is mounted from a controllably raisable and lowerable tool bar so as to extend slightly downwardly and away from the direction of travel. The blade has metal tubing attached to the trailing edge and aligned therewith, and one or more openings in the tubing for the release of soil chemical supplied to the tubing by supply means. The generally L-shaped blade is formed of flat metal stock bent transversely to form the L. Generally the blades are employed in pairs.

BACKGROUND OF THE INVENTION

Field of the invention

The invention relates to apparatus for the injection of a soil chemical into soil adapted for cultivation and loose enough to permit ready passage therethrough of plows, chisels, knives and the like. The term soil chemical is intended to embrace gaseous, liquid and solid particulate material that is injected into the soil for agricultural purposes and includes, e.g., soil fumigants, soil modifiers, fertilizers, herbicides, insecticides, rodenticides, and fungicides. The apparatus is especially useful in arid regions such as agricultural regions in the southwestern and western United States where water from rainfall and from normal irrigation practices is inadequate for stalk and crop debris deterioration from one growing season to the next. The normal cultural practice is to apply fertilizers in a series of bands or rows and to list or bed-up the soil over the bands of fertilizer. To conserve moisture, the bed is left undisturbed from the prior growing season until planting. Should a soil fumigant be needed for nematode control, it must be applied prior to bedding.

Equipment is needed that can also be used to apply chemicals after listing or bedding so that the beds are not disturbed. If the bed is disturbed in windy areas, the soil dries and allows wind erosion of the surface of the bed. It is also desirable to be able to apply, in addition to soil fumigants, systemic insecticides, systemic fungicides, anhydrous ammonia, liquid and granular fertilizers and trace elements to bedded-up soil while the field crop is growing, typically as side dressing treatments.

Description of the prior art

The prior art devices consist of so-called chisels or knives which depend vertically downward from a tool bar or other support means so as to extend substantially vertically downward into the soil during use. Injection of soil chemicals is carried out by attaching a metal tube to the trailing edge of the chisel or knife, such tube having an opening adjacent the lower end of the chisel or knife, or additional holes as desired. Such chisels or knives tear up the bed and also suffer from the disadvantage that undeteriorated stalk and crop debris collect on the leading edge of the chisel or knife, or the shank thereof. The furrow created by the prior art chisel or knife can be closed with appropriate rolling compaction equipment but this requires additional and more complicated agricultural equipment which cannot always be used after the field crop is growing, especially in the event it is desired to inject soil chemical substantially underneath the growing plants.

Objects of the invention

An important object of the invention is to provide apparatus for the injection of soil chemicals into beds or listed land in arid areas substantially without disturbing the bed and causing moisture loss and substantially without collecting undeteriorated stalk or crop debris.

Another object of the invention is to provide apparatus for soil injection which is readily used to inject a soil chemical close to or beneath a growing field row crop in a bed substantially without disturbing the bed.

Yet a further object of the invention is to provide apparatus for injection of a soil chemical which does not form a furrow in the soil such that a tamping or compacting device is required to close the furrow in order to prevent excessive moisture loss.

Summary of the invention

The present apparatus for the injection of a soil chemical into agricultural land or tillable soil is made up of at least one generally L-shaped blade, but ordinarily of two opposed generally L-shaped blades, having the foot of each blade adapted to be pulled through the soil; soil chemical distribution means attached to the trailing edge of each such foot; means for supplying and transmitting a soil chemical to the soil chemical distribution means and means for mounting each said generally L-shaped blade on controllably raisable and lowerable support means mounted on a farm field vehicle. The generally L-shaped blade is formed of generally flat rectangular metal stock bent to substantially form an L, the bend being substantially normal to a flat side of the blade, but the included angle being slightly greater than 90 degrees. Further, the blade is mounted so that the foot extends slightly downward and away from the line of travel of the farm field vehicle and backwardly of a line passing through the point of attachment of the blade to the tool bar and normal to the line of travel.

Preferably, the included angle of the L is in the range of about 100 to 105 degrees. It is also preferred that the free end of the foot of the blade is pointed away from the direction of travel of the said vehicle at an angle in the range of about 50 to 60 degrees from the line of travel.

Brief description of the drawing

The apparatus of the invention will be more clearly understood with reference to the drawings in which FIG. 1 is a rear elevation of a tractor having a tool bar with knives of the invention mounted thereon;

FIG. 2 is a front elevation of an applicator knife having a mounting shank attached thereto;

FIG. 3 is an enlarged and foreshortened side or profile view of a single knife or blade according to the invention having openings only at the free end;

FIG. 4 is a profile view of a knife or blade similar to that of FIG. 3 except that the knife has a series of openings in the tube at the trailing edge of the foot substantially throughout the length thereof; and FIG. 5 is a fragmentary portion of a plan view of apparatus similar to that shown in FIG. 1, showing a pair of opposed blades attached to the tool bar and indicating the relative angle of the centerline of the foot of each blade with respect to the direction of travel.

Referring now to FIG. 1 there is seen in rear elevation a tractor 10 having a controllably raisable and lowerable tool bar 11 attached to double-acting hydraulic cylinders, 12, 13. Right hand generally L-shaped blades 14 and left hand generally L-shaped blades 15 are shown disposed in pairs on the tool bar with the free ends 16, 17 of the respective feet 18, 19 disposed in adjacent but spaced apart relationship, in the case of each respective pair.

The generally L-shaped blades 14, 15 are conveniently mounted on the tool bar 11 by means of respective detachable connectors 20, such as plow shanks having a generally cylindrical shank portion 21 joined to a generally flattened shank portion (not shown). The cylindrical portion of the connector 20 is in each case inserted into a clamp 22 which is adjustable to permit rotation of the connector 20 and thus the blade 14 or 15 to an appropriate angle with respect to the direction of travel of the tractor or vehicle 10.

Attached to the trailing edge 23 of each of the L-shaped blades 14, 15, as by welding, is a small metal tube 24 that extends substantially along edge 23 of both the leg and foot of each blade. Each tube 24 has an opening 25 adjacent a free end 16, 17 of a foot 18, 19 of a blade 14, 15. The ends of the tubes 24 adjacent the upper ends of the blades next to the connectors 20 are preferably reamed or flared so that the conduit means 26, such as polyethylene tubing, can be easily inserted therein. At the free ends of the feet 14 or 15, of the blades, the tip of the tube 24 is ground back, preferably at a 45 degree angle, to provide a very substantial opening 25 for the discharge of soil chemicals. More preferably, there is also provided a very small opening 29 about ⅛-inch in diameter about ¼-inch from the edge of the larger opening 25 and a ring 30 is inserted around the intervening metal between the two openings, such as a hog ring. The free jiggling action of such ring 30 as the blade moves through the soil will prevent the major opening 25 from plugging in most soils. The leading edges 31, 32 are preferably hardened as by tempering, for greater wear resistance.

The conduit means 26 ordinarily takes the form of flexible tubing such as polyethylene tubing having an outer diameter of an appropriate size to wedge either into the inside of the metal tube 24 or over the outside thereof. If desired, any other suitable conduit means, such as metal tubing, may be used and appropriate connections provided to connect such tubing to metal tube 24. The conduit means 26 is also connected to the soil chemical reservoir means 27, indicated schematically in FIG. 1.

In making up the knife according to the invention it is suitable to take a piece of flat tool steel about 36 inches long, 2 inches wide and about ½-inch thick, although other similar dimensions may be found equally suitable, and to heat the steel piece and bend it about its flat side to form a gentle curve centered about 20½ inches, i.e., about three-fifths to two-thirds of the length thereof, from one end. Bending should be continued until the metal is bent about 75 to 80 degrees from the axis or centerline of the original straight piece, i.e., until the included angle, shown as $x$ in FIG. 3, is about 100 to 105 degrees. The terminal 2 inches of the elongated foot of the blade so-formed should be ground off and rounded from the edge which is to be the front or leading edge to the trailing edge, as indicated in FIG. 2 wherein is shown a knife which is adapted to serve as one of the left hand knives 19 shown in FIG. 1. A second blade, so-prepared, is tapered in the opposite direction at the free end of the foot in order to provide right hand knives such as knives 18 shown in FIG. 1.

A Ford plow shank or other suitable mounting means having a cylindrical shank portion, e.g., about 2 inches in diameter, joined to a generally flattened shank portion, is attached to each prepared blade by drilling holes through the blade, such as holes 28 shown in FIG. 2, which must align with similar holes in the plow shank, and bolting the blade to the plow shank. The assembled blade and plow shanks are then readily inserted in standard clamps such as the clamps 22 of FIG. 1. Such clamps are adjustable length-wise of the tool bar 11 and also, on being loosened, permit rotation of the cylindrical portion of the shank within the clamp.

A small metal pipe or tube such as a ⅛-inch diameter pipe is welded to the trailing edge of the knife or blade.

Another embodiment of the soil injection knife or blade of the invention having a plurality of openings in the tube at the trailing edge of the foot is shown in FIG. 4. It is usually preferred to provide a tube that is closed or substantially closed at the free end of the foot of the knife. Or, if a knife with a large opening at the free end of the foot is to be modified to provide a plurality of openings, it is best to plug or otherwise close such large opening. Knives with a plurality of holes in the tube at the trailing edge are used for band or broadcast injection of soil chemicals.

In using the present apparatus for injection of soil chemicals the knives are so-mounted on the tool bar and the tool bar is so-lowered that the foot portion of each knife extends at least somewhat downwardly from the horizontal plane and the shank of the knife in each case is rotated so that the free end of the foot extends backwardly from the direction of travel.

Referring more particularly to FIG. 5 in which there is shown a fragmentary portion of a plan view of apparatus similar to the assembly of FIG. 1, the letter D identifies the direction and line of travel aligned with the vertical axis of the connector 20 of the right hand knife and the letter P indicates the center line or axis of the foot of a right hand knife 18. The included angle $y$ formed by the intersection of line D and P is preferably an angle in the range of about 30 to 40 degrees. Knives so-disposed tend to let stalks and other crop debris flow past the knife tips easily, and minimum disturbance of the soil bed is obtained with knives so-disposed.

For most bed treatments and for side dressing growing field crops a pair of knives is disposed approximately as shown in FIG. 5 with the tips or free ends of the feet approximately 12 inches apart. Usually the bed is large enough that about 12 to 15 inches of the foot extends into the soil. Injection of soil chemical takes plate at the large openings at the tips of the blades. For broadcast treatment, it is usually desired to have soil chemical injected in a series of wide continuous bands extending across the field. This is readily accomplished by employing blades with a plurality of openings in the discharge tube at the trailing edge of each blade, and further, by setting the shanks of the blades in a given pair close enough together for the foot of each blade in the pair to broadcast over mutually contiguous bands. Rather than mount each blade so that the tips in the pair are touching, however, it is preferred to rotate one foot somewhat closer to the direction of travel while rotating the other slightly away. As a result the feet are staggered, the free ends or tips are separated by about 3 to 10 inches or more and crop debris flows smoothly past the staggered free ends without being caught and collected.

Among the advantages of the present improved apparatus for injection of soil chemicals is the ease with which the improved knives or blades are drawn through the soil and the minimal disturbance of the bed whereby soil compaction equipment is not needed to make a seal after the blade passes through the soil.

The apparatus of the invention having been thus fully described various modifications thereof will at once become apparent to those skilled in the art and the scope of the invention is to be considered limited only by the breadth of the claims hereafter appended.

We claim:
1. Apparatus for the injection of a soil chemical into cultivated soil which comprises:
    at least one generally L-shaped blade having the foot thereof adapted to be pulled through the soil, said foot having a leading edge, facing the direction of travel through the soil, and a trailing edge;
    soil chemical distribution means attached to the trailing edge of each such foot;
    means for supplying and transmitting a soil chemical to said soil chemical distribution means;

and means for mounting each said generally L-shaped blade on controllable raisable and lowerable support means mounted on a farm field vehicle;

said generally L-shaped blade being formed of generally flat rectangular metal stock bent to form the L, the bend being substantially normal to a flat side of the blade.

2. The apparatus as in claim 1 in which the generally L-shaped blade is mounted on the controllable support means so that the foot of the blade that normally travels under the surface of the soil is disposed with the free end of the blade pointing away from the direction of travel of the said vehicle at an angle in the range of about 30 to 40 degrees from the line of travel.

3. The apparatus as in claim 1 in which at least one pair of spaced-apart, opposed, generally L-shaped blades is mounted on said support means in operative relationship so as to penetrate the soil when the support means is lowered.

4. The apparatus as in claim 1 in which the free end of the at least one generally L-shaped blade is tapered back from the leading edge thereof to a blunt point at the trailing edge.

5. The apparatus as in claim 1 in which the said soil chemical distribution means is a metal tube attached to the trailing edge of said generally L-shaped blade and said metal tube has at least one opening therein facing substantially away from said generally L-shaped blade.

6. A soil chemical applicator blade adapted to be mounted on a farm tractor, connected to a supply of soil chemical and thrust into and moved through soil adjacent to a row crop, which comprises:

a generally L-shaped blade formed of generally flat rectangular metal stock bent to form an L, the bend being substantially normal to a flat side of the blade, and the included angle being in the range of about 100 to 105 degrees;

said generally L-shaped blade having an end adapted for mounting on support means and a free end;

said generally L-shaped blade having a leading edge and a trailing edge with respect to normal travel through the soil;

soil chemical distribution means consisting of a metal tube attached along said trailing edge and substantially co-extensive therewith, said metal tube having an end adjacent the mounting end of the blade and adapted to be connected to conduit means for soil chemical reservoir means, and at least one opening formed through the side wall thereof said metal tube, said at least one opening facing substantially away from the generally L-shaped blade;

and said generally L-shaped blade being tapered at its free end from the leading edge to the trailing edge to form a blunt point at the trailing edge.

7. In a combination of parts for the subsurface application of a soil chemical comprising a farm tractor provided with a controllably raisable and lowerable tool bar, a soil chemical applicator mounted on the tool bar and adapted to be thrust into and pulled through the soil, soil chemical reservoir means carried by the farm tractor, and conduit means for the soil chemical leading from the said reservoir means to the said soil chemical applicator, the improvement in soil chemical applicator which comprises:

a generally L-shaped blade formed of generally flat rectangular metal stock bent to form an L, the bend being substantially normal to a flat side of the blade, and the included angle being in the range of about 100 to 105 degrees;

said generally L-shaped blade having an end adapted for mounting on support means and a free end;

said generally L-shaped blade having a leading edge and a trailing edge with respect to normal travel through the soil;

soil chemical distribution means consisting of a metal tube attached along said trailing edge and substantially co-extensive therewith, said metal tube having an end adjacent the mounting end of the blade and adapted to be connected to said conduit means from said soil chemical reservoir means, and at least one opening formed through the side wall thereof said metal tube, said at least one opening facing substantially away from the generally L-shaped blade;

and said generally L-shaped blade being tapered at its free end from the leading edge to the trailing edge to form a blunt point at the trailing edge.

References Cited

UNITED STATES PATENTS

| 3,146,740 | 9/1964 | Phillips | 111—7 |
| 3,369,506 | 2/1968 | Stralow et al. | 111—6 |

FOREIGN PATENTS

| 180,743 | 1/1887 | France. |
| 530,673 | 9/1956 | Canada. |

ROBERT E. BAGWELL, *Primary Examiner.*

U.S. Cl. X.R.

172—438, 720